Figure 1:
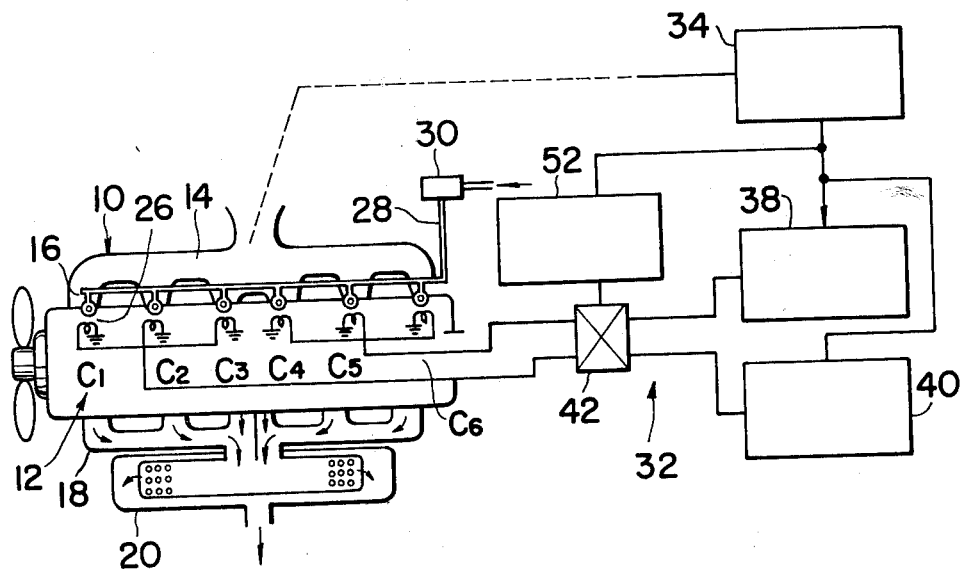

United States Patent [19]

Masaki

[11] 4,051,816
[45] Oct. 4, 1977

[54] METHOD OF AND APPARATUS FOR CONTROLLING AIR-FUEL MIXTURES INTO A MULTI-CYLINDER INTERNAL COMBUSTION ENGINE

[75] Inventor: Kenji Masaki, Yokohama, Japan

[73] Assignee: Nissan Motor Company, Limited, Yokohama, Japan

[21] Appl. No.: 584,133

[22] Filed: June 5, 1975

[30] Foreign Application Priority Data

June 13, 1974  Japan ................................. 49-67463

[51] Int. Cl.² ...................... F02M 51/00; F02B 75/10
[52] U.S. Cl. .................................. 123/32 EA; 60/274; 60/282; 123/119 LR

[58] Field of Search ....... 123/32 EA, 198 DB, 198 F, 123/179 L, 119 LR; 60/276, 285, 282, 284, 301, 289

[56] References Cited

U.S. PATENT DOCUMENTS

| | | | |
|---|---|---|---|
| 2,875,742 | 3/1959 | Dolza | 123/198 F X |
| 3,589,344 | 6/1971 | Steinke | 123/8.09 |
| 3,708,980 | 1/1973 | Truxell | 123/32 ST X |
| 3,827,237 | 8/1974 | Linder et al. | 60/276 X |
| 3,910,240 | 10/1975 | Omori et al. | 60/285 X |

*Primary Examiner*—Carroll B. Dority, Jr.
*Assistant Examiner*—Tony M. Argenbright

[57] ABSTRACT

Two groups of cylinders are alternately fed with rich and lean mixtures.

9 Claims, 2 Drawing Figures

METHOD OF AND APPARATUS FOR CONTROLLING AIR-FUEL MIXTURES INTO A MULTI-CYLINDER INTERNAL COMBUSTION ENGINE

The present invention relates generally to a method of and an apparatus for controlling air-fuel mixtures into a multi-cylinder internal combustion engine and particularly to a method and an apparatus in which two groups of cylinders of the engine are cyclically switched over or alternated between lean and rich mixtures so that when one group of cylinders is fed with the lean mixture, the other group is fed with the rich mixture.

As is well known in the art, a lean and rich mixture supply technique has been proposed in which a cylinder or cylinders of a multi-cylinder internal combustion engine are supplied with a relatively lean air-fuel mixture having an air-fuel ratio preferably higher than 18:1 and the remaining cylinder or cylinders are supplied with a relatively rich air-fuel mixture having an air-fuel ratio preferably lower than 14:1. According to such a technique, two differently composed exhaust gases resulting from combustion of the lean and rich air-fuel mixtures are alternately discharged from the engine into the thermal reactor thereof and mixed with each other therein to effect satisfactory oxidation of burnable harmful components such as hydrocarbons (HC) and carbon monoxide (CO) in the engine exhaust gases.

However, in such a conventional lean and rich mixture supply technique, the lean and rich air-fuel mixtures generate different output torques in each group of cylinders which cause uneven wear to occur thereby distorting the cylinders and the components thereof. Furthermore, the cylinders supplied with the rich air-fuel mixture are carbonized rapidly to deteriorate the performance of the engine.

It is, therefore, an object of the invention to provide a method and an apparatus in which the air-fuel mixtures supplied into the two groups of cylinders of the engine are cyclically switched over or alternated between a relatively rich mixture and a relatively lean mixture in such a manner that when one of the two groups is supplied with the rich mixture, the other group is supplied with the lean mixture and vice versa to prevent uneven wear occurring between the two groups of cylinders and carbonaceous buildup in some cylinders.

Figure 2:
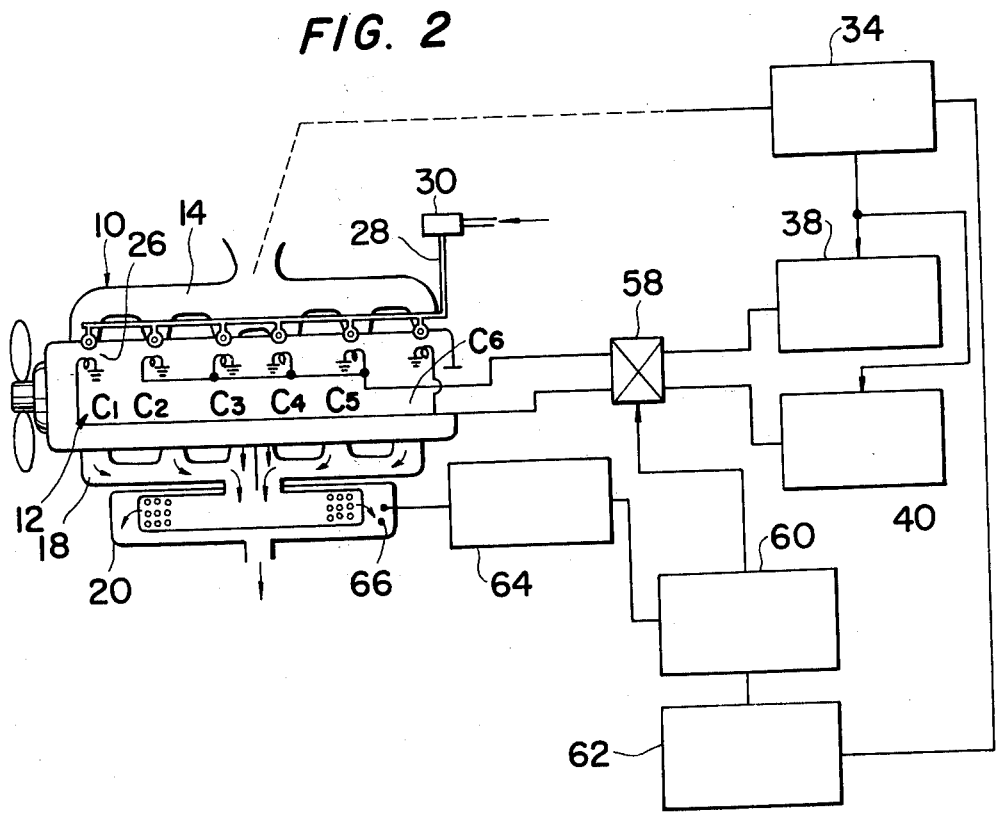

This and other objects and advantages of the invention will become more apparent from the following detailed description taken in connection with the accompanying drawings in which:

FIG. 1 shows a first preferred embodiment of an apparatus according to the invention for controlling the air-fuel mixtures into a multi-cylinder internal combustion engine; and FIG. 2 shows a second preferred embodiment of an apparatus according to the invention for controlling the air-fuel mixtures into a multi-cylinder internal combustion engine.

Referring to FIG. 1, an apparatus according to the invention for controlling air-fuel mixture into a multi-cylinder combustion engine is shown as being supplied to a six cylinder, fuel injection type internal combustion engine which is generally designated by the reference numeral 10. The engine 10 has cylinders 12 which are arranged in a first group of three cylinders $C_1$ to $C_3$ and a second group of remaining three cylinders $C_4$ to $C_6$.

The combustion chamber (not shown) of each cylinder 12 is fed with a charge of air from an intake manifold 14 which has intake branches or legs 16 leading to the individual cylinder 12. The combustion chambers of the cylinders 12 communicate through an exhaust manifold 18 with a thermal reactor or afterburner 20 which serves to effect oxidation of burnable harmful components such as hydrocarbons (HC) and carbon monoxide (CO) in the exhaust gases discharged from the engine 10 to purify or decontaminate the exhaust gases.

The apparatus comprises one electronically controlled fuel injection device or injector 26 for each cylinder 12. The fuel injection valves 26 are located in the inlet legs 16 immediately adjacent the intake valves (not shown) of the engine 10 and feed metered quantities of fuel into the charge of air for the individual cylinders 12 by injection of finely atomized liquid fuel under high pressure. Fuel is fed to the injection valves 26 from a distributing pipe 28 which communicates with a fuel pump (not shown) by way of a distributor 30. The fuel injected from the injection valves 26 is mixed with the charges of air fed to the cylinders 12 to form combustible air-fuel mixtures. The fuel injection valves 26 are arranged in a first group of three fuel injection valves used for three cylinders $C_1$ to $C_3$ of the first group and a second group of three fuel injection valves used for the remaining three cylinders $C_4$ to $C_6$ of the second group.

An electronic control system which is generally designated by the reference numeral 32 is provided to control the fuel injectors 26. The control system 32 comprises a computer 34 which senses the amount of air drawn into the engine 10 and calculates the load of the engine 10 from the sensed amount of air to generate an electric output signal corresponding to the value of the engine load. The computer means 34 is connected to first and second pulse generators 38 and 40 which control or determine the time duration of fuel injection of the injectors 26. Each of the first and second pulse generators 38 and 40 is alternatively connected to the first group of fuel injectors 26 and to the second group of fuel injectors 26 in such a manner that when one of the pulse generators is connected to the first group of fuel injectors, the other is connected to the second group of fuel injectors 26 and vice versa. Each of the pulse generators 38 and 40 calculates the amount of fuel for injection from each injector 26 on the basis of the output signal of the computer means 34 and an operating variable such as engine speed and generates a pulse signal having a pulse width or time duration corresponding to the calculated amount of fuel. The fuel injectors 26 are opened to inject fuel while the pulse signals from the pulse generators 38 and 40 activate the coils (not shown) of the injectors 26. Thus the amount of fuel injected per injection depends on the length of time that the coil of the fuel injector 26 is activated.

The first pulse generator 38 is set to generate a pulse signal having a narrow pulse width to energize the fuel injection valves 26 of the group connected to the first pulse generator 38 to cause them to inject a small quantity of fuel and thus form an air-fuel mixture leaner than a predetermined, for example, a stoichiometric air-fuel mixture. The second pulse generator 40 is set to generate a pulse signal having a wide pulse width to energize the fuel injection valves 26 of the group connected to the second pulse generator 40 to cause them to inject a large quantity of fuel and thus form an air-fuel mixture richer than the predetermined air-fuel mixture.

A switching or transfer relay 42 is provided to cyclically switch over or alternate connection of the first pulse generator 38 from the first group of fuel injection valves 26 to the second group and vice versa and concurrently switch over or alternate connection of the second pulse generator 40 from the second group of fuel injection valves 26 to the first group of fuel injection valves 26 and vice versa. The switching relay 42 may be connected with a starter switch (not shown) of the engine 10. The starter switch generates an energizing signal, which is applied to the switching relay 42 to energize it whenever the engine 10 is started. The switching relay 42 may be a high speed switching relay which is connected with a pulse counter 52, as shown in FIG. 1. The pulse counter 52 is connected to the computer 34 to receive the output signals or pulses thereof. The pulse counter 52 integrates the pulses of the computer 34 and generates an energizing signal, which is applied to the high speed switching relay to energize it, when the number of the integrated pulses reaches a predetermined value, that is, whenever the number of rotations of the engine 10 reaches a predetermined value. The switching relay 42 may be connected with a timer (not shown). The timer generates an energizing signal, which is applied to the switching relay 42 to energize it, each time the predetermined period of time elapses.

With the arrangement thus far described, when the first and second pulse generators 38 and 40 are connected respectively with the first and second groups of fuel injectors 26, a small quantity of fuel is injected from the first group of fuel injectors 26 into the charges of air for the first group of cylinders $C_1$ to $C_3$ to form a relatively lean air-fuel mixture, while a large quantity of fuel is injected from the second group of fuel injectors 26 to the charge of air for the second group of cylinders $C_4$ to $C_6$ to form a relatively rich air-fuel mixture. As a result, when the ignition sequence of the six cylinders $C_1$ to $C_6$ is $C_1$-$C_5$-$C_3$-$C_6$-$C_2$-$C_4$, the combustion sequence thereof is L-R-L-R-L-R during one rotation of the engine 10, where L represents the relatively lean air-fuel mixture and R the relatively rich air-fuel mixture. Accordingly, two differently composed exhaust gases resulting respectively from combustion of the relatively lean and rich air-fuel mixtures are alternately fed into the thermal reactor 20 and are mixed with each other therein to effect satisfactory oxidation of burnable harmful components in the exhaust gases. When the switching relay 42 is energized to switch over connection of the first pulse generator 38 from the first group of fuel injectors 26 to the second group of fuel injectors 26 and concurrently switch over connection of the second pulse generator 40 from the second group of fuel injectors 26 to the first group of fuel injectors 26, a large quantity of fuel is injected from the first group of fuel injectors 26 to the charges of air for the first group of cylinders $C_1$ to $C_3$ to form a relatively rich air-fuel mixture, while a small quantity of fuel is injected from the second group of fuel injectors 26 to the charges of air for the second group of cylinders $C_4$ to $C_6$ to form a relatively lean air-fuel mixture. As a result, the rich and lean mixture combustion sequence of the six cylinders $C_1$ to $C_6$ is reversed to R-L-R-L-R-L during one engine rotation. Also, two differently composed engine exhaust gases are similarly alternately fed into the thermal reactor 20 for satisfactory decontamination of the engine exhaust gases.

Referring to FIG. 2, there is shown a second preferred embodiment of an apparatus according to the invention for controlling air-fuel mixtures into a multi-cylinder internal combustion engine. The engine 10 is shown to have six cylinders 12 which are arranged in a first group of two cylinders $C_1$ and $C_6$ and a second group of remaining four cylinders or majority of cylinders $C_2$ to $C_5$. In FIG. 2, like component elements are designated by the same reference numerals as those used in FIG. 1. As shown in FIG. 2, the fuel injection valves 26 are arranged in a first group of two fuel injection valves 26 employed for the two cylinders $C_1$ and $C_6$ of the first group and a second group of four fuel injection valves 26 employed for the four cylinders $C_2$ to $C_5$ of the second group. A switching or transfer relay 58 is connected to the output terminal of and controlled by an AND gate logic circit 60 which has two input terminals connected respectively to the output terminals of first and second comparator or discriminating circuits 62 and 64. The first discriminating circuit 62 is connected to a computer 34 to receive the output signal thereof. The first discriminating circuit 62 generates an output signal when receiving an output signal corresponding to medium and high engine load. A temperature sensor 66 is provided to sense the temperature in the thermal reactor 20 to generate an electric signal corresponding to the sensed temperature. The second discriminating circuit 64 is connected to the temperature sensor 66 to receive a temperature signal therefrom. The second discriminating circuit 64 generates an output signal on receiving an output signal corresponding to a temperature in excess of a predetermined level at which temperature the thermal reactor 20 is effective or active to oxidize burnable toxic constituents in the engine exhaust gases. The AND gate circuit 60 generates an energizing signal only when both the first and second discriminating circuits 62 and 64 generate an output signal. The switching relay 58 is set to provide connection between the first pulse generator 38 and the first group of fuel injection valves 26 and between the second pulse generator 40 and the second group of fuel injection valves 26 during cold and low load engine operation. The switching relay 58 is energized by the output signal of the AND gate circuit 60 to switch over connection of the first pulse generator 38 from the first group of fuel injection valves 26 to the second group of fuel injection valves 26 and switch over connection of the second pulse generator 40 from the second group of fuel injection valves 26 to the first group of fuel injection valves 26 during warmed-up medium and high load engine operation.

With the arrangement of FIG. 2 thus far described, during low load and cold engine operation when because of a relatively low temperature of the engine exhaust gases, the thermal reactor 20 is ineffective or inactive to oxidize burnable toxic components in the engine exhaust gases, a large quantity of fuel is injected from the second group of injection valves 26 into the charges of air for the second group of four cylinders $C_2$ to $C_5$ to form a relatively rich air-fuel mixture and a small quantity of fuel is injected from the first group of injection valves 26 to the charges of air for the first group of two cylinders $C_1$ and $C_6$ to form a relatively lean air-fuel mixture. Accordingly, when the ignition sequence to the six cylinders $C_1$ to $C_6$ is $C_1$-$C_5$-$C_3$-$C_6$-$C_2$-$C_4$, the rich and lean mixture combustion sequence thereof is L-R-R-L-R-R. As a result, the thermal reactor 20 quickly reaches its active temperature to promote engine exhaust gas cleaning or decontamination. During medium and high load and warmed-up engine operation when because of a relatively high temperature of the engine exhaust gases, the thermal reactor 20 is effective or active to oxidize burnable toxic components in the engine exhaust gases, a small quantity of fuel is injected from the second group of injection valves 26 to the charges of air for the second group of four cylinders $C_2$ to $C_5$ to form a relatively lean air-fuel mixture and a large quantity of fuel is injected from the first group of injection valves 26 to the charges of air for the first group of two cylinders $C_1$ and $C_6$ to minimize consumption of fuel. In this instance, the rich and lean mixture combustion sequence of the six cylinders $C_1$ to $C_6$ is R-L-L-R-L-L. Although the second group of cylinders $C_2$ to $C_6$ is fed with the relatively rich air-fuel mixture during low load engine operation are carbonized at a relatively high rate, the carbonaceous material in the second group of cylinders $C_2$ to $C_5$ is removed by high temperature gas resulting from combustion of the relatively lean air-fuel mixture fed during medium and high load engine operation.

It will be appreciated that the invention provides a method and an apparatus in which the air-fuel mixtures fed to two groups of cylinders of the engine are periodically switched over between a relatively lean mixture and a relatively rich mixture in such a manner that when one of the two groups is fed with the lean mixture, the other group is fed with the rich mixture, so that the problems associated with wear described previously have been minimized and the two groups of cylinders are carbonized at a similar rate.

What is claimed is:

1. A method of controlling an air-fuel mixture for an internal combustion engine, comprising the steps of
   alternatively forming a relatively rich air-fuel mixture having an air-fuel ratio lower than a predetermined air-fuel ratio and a relatively lean air-fuel mixture having an air-fuel ratio higher than said predetermined air-fuel ratio for a first combustion chamber of said engine,
   alternatively forming said rich and lean air-fuel mixtures for a second combustion chamber of said engine so that, when one of said rich and lean air-fuel mixtures is formed for said first combustion chamber, the other air-fuel mixture is formed for said second combustion chamber,
   sensing the lapse of a suitable time, and
   switching over said mixture formed for said first combustion chamber from one of said rich and lean air-fuel mixtures to the other air-fuel mixture and said mixture formed for said second combustion chamber from said other air-fuel mixture to said one air-fuel mixture in response to the lapse of said suitable time.

2. A method as claimed in claim 1, in which said predetermined air-fuel ratio is stoichiometric air-fuel ratio.

3. A method as claimed in claim 1, in which said suitable time is the interval needed for the number of rotations of said engine to reach a predetermined value.

4. An apparatus for controlling an air-fuel mixture for an internal combustion engine, comprising
   first means for alternatively forming a relatively rich air-fuel mixture having an air-fuel ratio lower than a predetermined air-fuel ratio and a relatively lean air-fuel mixture having an air-fuel ratio higher than said predetermined air-fuel ratio for a first combustion chamber of said engine,
   second means for alternatively forming said relatively rich and lean air-fuel mixtures for a second combustion chamber of said engine,
   third means alternatively connected to said first and second means and causing each of said first and second means, which are connected to said third means, to form said lean air-fuel mixture,
   fourth means alternatively connected to said first and second means so that, when said third means is connected to one of said first and second means, said fourth means is connected to the other of said first and second means, and causing each of said first and second means, which are connected to said fourth means, to form said rich air-fuel mixture,
   fifth means for generating an output signal in response to the lapse of a suitable time, and
   switching-over means connected to said fifth means to receive said output signal thereof and switching over connection of said third means from one of said first and second means to the other of said first and second means and connection of said fourth means from said other means to said one means in response to said output signal of said fifth means.

5. A combination of an internal combustion engine and an apparatus for controlling an air-fuel mixture for said engine, said engine including
   a first group of combustion chambers and
   a second group of combustion chambers, said apparatus comprising
   first means combined with said first group of combustion chambers and for alternatively forming a relatively rich air-fuel mixture having an air-fuel ratio lower than a predetermined air-fuel ratio and a relatively lean air-fuel mixture having an air-fuel ratio higher than said predetermined air-fuel ratio for said first group of combustion chambers,
   second means combined with said second group of combustion chambers and for alternatively forming said rich and lean air-fuel mixtures for said second group of combustion chambers,
   third means alternatively connected to said first and second means and causing each of said first and second means, which are connected to said third means, to form said lean air-fuel mixture,
   fourth means alternatively connected to said first and second means so that, when said third means is connected to one of said first and second means, said fourth means is connected to the other of said first and second means, and causing each of said first and second means, which are connected to said fourth means, to form said rich air-fuel mixture,
   fifth means for generating an output signal in response to the lapse of a suitable time, and
   switching-over means connected to said fifth means to receive said output signal thereof and switching over connection of said third means from one of said first and second means to the other of said first and second means and connection of said fourth means from said other means to said one means in response to said output signal of said fifth means.

6. An apparatus for controlling an air-fuel mixture for an internal combustion engine, comprising
   a first fuel injection valve for alternatively feeding fuel for forming a relatively rich air-fuel mixture having an air-fuel ratio lower than a predetermined air-fuel ratio and fuel for forming a relatively lean air-fuel mixture having an air-fuel ratio higher than said predetermined air-fuel ratio for a first combustion chamber of said engine, a second fuel injection valve for alternatively feeding fuel for forming said rich air-fuel mixture and fuel for forming said lean air-fuel mixture for a second combustion chamber of said engine, a first pulse generator alternatively connected to said first and second fuel injection valves and generating a first pulse signal having a pulse width which causes said fuel injection valve, connected to said first pulse generator, to inject fuel for forming said lean air-fuel mixture, a second pulse generator alternatively connected to said first and second fuel injection valves so that, when said first pulse generator is connected to one of said first and second fuel injection valves, said second pulse generator is connected to the other fuel injection valve and generating a second pulse signal having a pulse width which is broader than said pulse width of said first pulse signal and which causes said fuel injection valve, connected to said second pulse generator, to inject fuel for forming said rich air-fuel mixture, first means for generating an output signal in response to the lapse of a suitable time, and switching-over means connected to said first means to receive said output signal thereof and switching over connection of said first pulse generator from one of said first and second fuel injection valves to the other fuel injection valve and connection of said second pulse generator from said other fuel injection valve to said one fuel injection valve in response to said output signal of said first means.

7. An apparatus as claimed in claim 6, in which said predetermined air-fuel ratio is a stoichiometric air-fuel ratio.

8. A combination of an internal combustion engine and an apparatus for controlling an air-fuel mixture for said engine, said engine including a first group of combustion chambers and a second group of combustion chambers and the number of which is equal to the number of said first group of combustion chambers, said apparatus comprising a first group of fuel injection valves combined respectively with said first group of combustion chambers and each of which alternatively injects fuel for forming a relatively rich air-fuel mixture having an air-fuel ratio lower than a predetermined air-fuel ratio and fuel for forming a relatively lean air-fuel mixture having an air-fuel ratio higher than said predetermined air-fuel ratio for the corresponding combustion chamber, a second group of fuel injection valves combined respectively with said second group of combustion chambers and each of which alternatively injects fuel for forming said rich air-fuel mixture and fuel for forming said lean air-fuel mixture for the corresponding combustion chamber, a first pulse generator alternatively connected to said first and second groups of fuel injection valves and generating a first pulse signal having a pulse width which causes said group of fuel injection valves, connected to said first pulse generator, to inject fuel for forming said lean air-fuel mixture, a second pulse generator alternatively connected to said first and second groups of fuel injection valves so that, when said first pulse generator is connected to one of said first and second groups of fuel injection valves, said second pulse generator is connected to the other group of fuel injection valves and generating a second pulse signal having a pulse width which is broader than said pulse width of said first pulse signal and which causes said group of fuel injection valves, connected to said second pulse generator, to inject fuel for forming said rich air-fuel mixture, control means for controlling said pulse widths of said first and second pulse signals in accordance with the load of said engine, first means for generating an output signal in response to the lapse of a suitable time, and switching-over means connected to said first means to receive said output signal thereof and switching over connection of said first pulse generator from one of said first and second groups of fuel injection valves to the other group of fuel injection valves and connection of said second pulse generator from said other group of fuel injection valves to said one group of fuel injection valves in response to said output signal of said first means.

9. A combination as claimed in claim 8, in which said first means comprises means for counting the number of rotations of said engine and for generating said output signal in response to the number of rotations of said engine which has reached a predetermined value.

* * * * *